United States Patent
Suzuki et al.

(10) Patent No.: US 10,364,303 B2
(45) Date of Patent: Jul. 30, 2019

(54) IMINODIACETIC ACID TYPE CHELATE RESIN AND METHOD FOR PRODUCING SAME

(71) Applicant: HYMO Corporation, Tokyo (JP)

(72) Inventors: Aiko Suzuki, Tokyo (JP); Go Honda, Tokyo (JP)

(73) Assignee: HYMO Corporation, Marunouchi, Chiyoda-ku, Tokyo (JP)

( * ) Notice: Subject to any disclaimer, the term of this patent is extended or adjusted under 35 U.S.C. 154(b) by 11 days.

(21) Appl. No.: 15/763,648

(22) PCT Filed: Jan. 10, 2017

(86) PCT No.: PCT/JP2017/000389
§ 371 (c)(1),
(2) Date: Mar. 27, 2018

(87) PCT Pub. No.: WO2017/126355
PCT Pub. Date: Jul. 27, 2017

(65) Prior Publication Data
US 2018/0273652 A1  Sep. 27, 2018

(30) Foreign Application Priority Data

Jan. 20, 2016 (JP) .................... 2016-008380
Mar. 22, 2016 (JP) .................... 2016-056720

(51) Int. Cl.
*C08F 8/00* (2006.01)
*B01J 45/00* (2006.01)

(52) U.S. Cl.
CPC ............... *C08F 8/00* (2013.01); *B01J 45/00* (2013.01)

(58) Field of Classification Search
CPC .................................... C08F 8/00; B01J 45/00
USPC ........................................................ 521/31
See application file for complete search history.

(56) References Cited

U.S. PATENT DOCUMENTS 5,630,907 A * 5/1997 Nilz ..................... C08F 8/12
162/168.1
5,830,844 A * 11/1998 Detering ............. C11D 3/0021
510/475

FOREIGN PATENT DOCUMENTS

| JP | 06145216 A | * | 5/1994 |
| JP | H06-145216 A | | 5/1994 |
| JP | 07195083 A | * | 8/1995 |
| JP | H07195083 A | | 8/1995 |
| JP | H07-252791 A | | 10/1995 |
| JP | H08-503015 A | | 4/1996 |
| JP | 2005002414 A | | 1/2005 |
| JP | 2005021883 A | | 1/2005 |
| JP | 2006328203 A | | 12/2006 |
| JP | 2011-088047 A | | 5/2011 |
| JP | 2016-098235 A | | 5/2016 |
| WO | WO2007127587 A1 | | 11/2007 |
| WO | WO2017126355 A1 | | 7/2017 |

OTHER PUBLICATIONS

International Search Report for corresponding PCT App. No. PCT/JP2017/000389, dated Mar. 7, 2017, 3 pages (Japanese language).
International Search Report for corresponding PCT App. No. PCT/JP2017/000389, dated Mar. 7, 2017, 2 pages (English translation).
Koreneva, et al., Coordination of europium(III) ion by poly(vinylpyrrolidone)poly(vinyliminodiacetic acids), Koordinatsionnaya Khimiya, 1980, 6(11), p. 1667-1671, 6 pages.
Naka et al., Polymer-metal chelate precursor reduced its firing temperature and time for preparing yttrium barium cuprate powder, Journal of Materials Science 31 (24); pp. 6389-6394, 1996.

* cited by examiner

*Primary Examiner* — Michael Bernshteyn
(74) *Attorney, Agent, or Firm* — Koenig IP Works, PLLC

(57) ABSTRACT

An iminodiacetic acid type chelate resin which can be easily and efficiently produced and which can efficiently adsorb and separate metal ions; and a method for producing the same are developed. The use of a chelate rein having a carboxymethyl group introduced into primary amino groups of the polyvinylamine crosslinked polymer particles can facilitate the efficient adsorption and separation of metal ions in water. The chelate resin can be obtained by a production method in which an N-vinyl carboxylic acid amide is suspension polymerized with a crosslinkable monomer in salt water in the presence of a dispersant thereby to obtain a polyvinyl carboxylic acid amide crosslinked polymer particles, and the obtained polyvinyl carboxylic acid amide crosslinked polymer is hydrolyzed to thereby introduce a carboxymethyl group into primary amino groups of the polyvinylamine crosslinked polymer particles.

2 Claims, No Drawings

IMINODIACETIC ACID TYPE CHELATE RESIN AND METHOD FOR PRODUCING SAME

TECHNICAL FIELD

The present invention relates to an iminodiacetic acid type chelate resin and a method for producing the same.

BACKGROUND ART

A strict effluent regulation is imposed on metal contained in industrial drainage water, such as mercury, cadmium, copper, and zinc which are hazardous to the human body. Accordingly, further improved treatment effects are required. In recent years, the demand for metal resources is also increasing. In particular, rare metal and noble metal are used as essential materials in various areas such as semiconductor lasers and battery materials. Since the reserve and supply amount of such metal are limited, it is desired to recover metal from waste substances and waste liquids.

Under such circumstances, it is attempted to adsorb and remove metal ions by treating drainage water with a chelate resin. Since the ability to form a complex with metal ions varies depending on the functional group structure of the chelate resin, chelate resins having an iminodiacetic acid group, a polyamine group, an amino phosphate group, an isothionium group, a dithiocarbamic acid group, a glucamine group, and the like are commercially available. Among these, an iminodiacetic acid group, which has the ability to form a complex with various metals, is widely utilized. For example, Patent Literature 1 describes that an iminodiacetic acid is introduced into a chelate resin having polyethyleneimine on the surface, thereby to further strengthen the chelate effects. Patent Literature 2 discloses a chelate resin in which an iminodiacetic acid and an amino group are introduced into and bonded to a resin carrier. Patent Literature 3 discloses a metal adsorbent in which a primary amino group of a polyamine-based macromolecule is N-carboxymethylated to become an iminodiacetic acid group in a macromolecule-fixed type metal adsorbing material in which a polyamine-based macromolecule is fixed to an insoluble carrier. Patent Literature 4 discloses a chelator which has a functional group selected from an iminodiacetic acid, an N-methyl-D-glucamine, and polyethyleneimine. Patent Literature 5 discloses a chelating agent of a polyethylene iminodiacetic acid.

However, the fact is that a general-purpose chelate resin having an iminodiacetic acid group does not necessarily have satisfactory adsorption effects. To address this concern, there is a demand for a chelate resin which can be easily and efficiently produced and can efficiently adsorb and separate metal ions, compared to a known chelate resin having an iminodiacetic acid group which is used for adsorbing metal ions.

Patent Literature 1: Japanese Patent Application Laid-Open No. 2005-21883
Patent Literature 2: Japanese Patent Application Laid-Open No. 2006-328203
Patent Literature 3: Japanese Patent Application Laid-Open No. 2011-88047
Patent Literature 4: Japanese Patent Application Laid-Open No. 2005-2414
Patent Literature 5: International Publication No. WO2007-127587

SUMMARY OF INVENTION

Technical Problem

A purpose of the present invention is to efficiently adsorb and remove metal ions from industrial waste water and the like. A further purpose of the present invention is to provide: a chelate resin which can be easily and efficiently produced and which has an excellent adsorption ability to metal ions; and a method for producing the same.

Solution to Problem

The present inventor intensively conducted research for achieving the above-described purpose. As a result, first, an N-vinyl carboxylic acid amide is suspension polymerized with a crosslinkable monomer in salt water in the presence of a dispersant thereby to obtain polyvinyl carboxylic acid amide crosslinked polymer particles. After salt and the like are removed by washing with water, the obtained polyvinyl carboxylic acid amide crosslinked polymer particles are hydrolyzed to obtain polyvinylamine crosslinked polymer particles. Thereafter, a carboxymethyl group is introduced into primary amino groups of the polyvinylamine crosslinked polymer particles. It has been found that the resulting iminodiacetic acid type chelate resin is effective in adsorbing metal ions.

That is, the present invention relates to: an iminodiacetic acid type chelate resin in which a carboxymethyl group is introduced into primary amino groups of polyvinylamine crosslinked polymer particles obtained by suspension polymerizing an N-vinyl carboxylic acid amide and a crosslinkable monomer in salt water in the presence of a dispersant to obtain polyvinyl carboxylic acid amide crosslinked polymer particles, and thereafter hydrolyzing the crosslinked polymer; and a method for producing the same.

Advantageous Effects of Invention

According to the present invention, metal ions in water can be efficiently adsorbed by using an iminodiacetic acid type chelate resin produced by a production method of introducing a carboxymethyl group into primary amino groups of polyvinylamine crosslinked polymer particles which can be easily and efficiently obtained without using an organic solvent.

DESCRIPTION OF EMBODIMENTS

Hereinafter, the present invention will be described in detail.

The chelate resin according to the present invention is obtained by introducing a carboxymethyl group into primary amino groups of polyvinylamine crosslinked polymer particles. First, a method for producing the polyvinylamine crosslinked polymer particles will be described. As a technique for the production, a suspension polymerization method is employed. That is, since a specific water soluble monomer is used in the present invention, suspension polymerizaton is performed in highly concentrated salt water, unlike in common suspension polymerizaton. Specifically, the suspension polymerization is performed by: suspending in salt water an N-vinyl carboxylic acid amide, a crosslinkable monomer, a monomer copolymerizable with the N-vinyl carboxylic acid amide as necessary, a polymerization initiator, and a dispersant; stirring the suspension with a certain strength to generate monomer droplets; and performing radical polymerization. The particle size of the monomer droplets can be controlled by the dispersant and the stirring strength, and is 0.01 mm to 10 mm, and preferably 0.1 mm to 5 mm.

Examples of the monomer of the N-vinyl carboxylic acid amide used in the present invention may include N-vinylformamide, N-methyl-N-vinylformamide, N-vinylacetamide, N-methyl-N-vinylacetamide, N-vinylpropionamide, N-methyl-N-vinylpropionamide, N-vinylbutyramide, and N-vinylisobutyramide. Among these, N-vinylformamide and N-vinylacetamide are preferable. Other than the monomer of the N-vinyl carboxylic acid amide, a monomer copolymerizable with the N-vinyl carboxylic acid amide may be used. Examples of such a monomer may include (meth)acrylonitrile, (meth)acrylamide, N-alkyl(meth)acrylamide, N,N'-dialkyl(meth)acrylamide, N,N'-dialkylaminoalkyl(meth)acrylamide, an alkali metal salt or ammonium salt of a (meth) acrylamidealkanesulfonic acid, an alkali metal salt or ammonium salt of a (meth)acrylic acid, hydroxyalkyl (meth) acrylate, dialkylaminoalkyl (meth) acrylate, a (meth)acryloyloxyalkyl-trimethylammonium salt, an alkali metal salt or ammonium salt of a (meth) acryloyloxyalkanesulfonic acid, N-vinylpyrrolidone, a diallyl-dialkylammonium salt, vinylpyridine, vinylimidazole, a vinylbenzyltrialkylammonium salt, and an alkali metal salt or ammonium salt of vinylsulfonic acid. One of these monomers maybe used, or two or more thereof maybe used in combination. In particular, acrylonitrile is preferable.

Examples of the crosslinkable monomer to be used may include: an aromatic polyvinyl compound such as divinylbenzene, trivinylbenzene, and divinyltoluene; poly(meth)acrylate such as ethylene glycol di(meth)acrylate, diethylene glycol di(meth)acrylate, glycerol di(meth)acrylate, and trimethylolpropanetri (meth) acrylate; andmethylenebisacrylamide. However, since poly(meth)acrylate, methylenebisacrylamide, and the like are easily hydrolyzed, an aromatic divinyl compound is preferably used. Most preferably, divinylbenzene is used. Other examples may include triallyl cyanurate, triallyl isocyanurate, triallyl phosphate, triallylamine, tetraallyloxyethane, allyl ethers such as pentaerythritol diallyl ether, pentaerythritol triallyl ether, and pentaerythritol tetraallyl ether, and poly(meth)allyloxy alkane. Among these, allyl ethers can be suitably used. The addition rate with respect to monomers is 0.1 to 50% by mass, and preferably 0.1 to 20% by mass. When the addition rate exceeds 5% by mass, spherical particles become difficult to obtain with only the N-vinyl carboxylic acid amide. Therefore, it is preferable to use the monomer copolymerizable with the N-vinyl carboxylic acid amide. The addition rate of the monomer copolymerizable with the N-vinyl carboxylic acid amide is 0.1 to 50% by mass with respect to all monomers. Acrylonitrile is particularly preferably used.

As the polymerization initiator, an azo-based or peroxide-based polymerization initiator is used. Examples thereof may include: 2,2'-azobis(2,4-dimethylvaleronitrile), 2,2'-azobis(4-methoxy-2,4-dimethylvaleronitrile), 2,2'-azobis(2-methylpropionitrile), 2,2'-azobis-2-amidinopropane hydrochloride, 4,4'-azobis-4-cyanovalephosphoric acid, 2,2'-azobis[2-(5-methyl-imidazoline-2-yl)propane] hydrochloride, 2,2'-azobis[2-(2-imidazoline-2-yl)propane] hydrochloride; and ammonium peroxodisulfate or potassium peroxodisulfate, hydrogen peroxide, benzoyl peroxide, lauroyl peroxide, octanoyl peroxide, succinic peroxide, and t-butylperoxy-2-ethylhexanoate. Among these, oil soluble initiators such as 2,2'-azobis(2,4-dimethylvaleronitrile) and 2,2'-azobis(4-methoxy-2,4-dimethylvaleronitrile) are preferable. Also, two or more types of initiators may be used in combination. The addition rate with respect to monomers is 0.02 to 5% by mass, and preferably 0.05 to 2% by mass.

Examples of the salt may include ammonium sulfate, sodium sulfate, ammonium chloride, sodium chloride, and calcium chloride. Among these, ammonium sulfate is particularly preferable. One of these salts may be used alone, or two or more thereof may be mixed. The addition rate with respect to water is 30 to 100% by mass. When the addition rate is less than 30% by mass, phase separation between a monomer phase and a salt water phase is insufficient. When the addition rate exceeds 100% by mass, poor economy is caused. The addition rate is preferably 50 to 90% by mass, and further preferably 60 to 90% by mass.

As the dispersant, a macromolecular dispersant is preferable. The macromolecular dispersant to be used can be ionic or nonionic. However, an ionic macromolecular dispersant is preferable. The ionic macromolecule is obtained by polymerizing (meth) acryloyloxyethyl trimethylammonium chloride, dimethyl diallylammonium chloride, or the like, which is a cationic monomer. Also, a copolymer between the cationic monomer and a nonionic monomer can be used. Examples of the nonionic monomer may include acrylamide, N-vinylformamide, N-vinylacetamide, N-vinylpyrrolidone, N,N'-dimethylacrylamide, acrylonitrile, diacetone acrylamide, and 2-hydroxyethyl (meth)acrylate. Examples of the nonionic macromolecular dispersant may include polyvinyl alcohol and polyethylene glycol polyacrylamide. The weight average molecular weight of the ionic macromolecular dispersant is 5, 000 to 5, 000, 000, and preferably 50,000 to 3,000,000. The weight average molecular weight of the nonionic macromolecular dispersant is 1, 000 to 100, 000, and preferably 1,000 to 50,000. The addition rate with respect to water is usually 0.05 to 5% by mass, and preferably 0.1 to 2% by mass.

The polymerization reaction is usually performed at a temperature of 30° C. to 100° C. for a time of 1 hour to 15 hours.

After the polymerization, the salt, the dispersant, an unreacted monomer, and the like can be removed by washing with water.

The copolymer particles are purified by the above-described method, and subsequently subjected to hydrolysis. The hydrolysis of the N-vinyl carboxylic acid amide crosslinked polymer particles can be performed under a basic or acidic condition. However, performing hydrolysis under a basic condition is preferable for obtaining free type polyvinylamine crosslinked polymer particles. Performing hydrolysis under an acidic condition is preferable for obtaining salt type polyvinylamine crosslinked polymer particles.

The base suitable for hydrolysis is not particularly limited as long as the pH during hydrolysis can be kept within the range of 8 to 14. Most preferably, an aqueous solution of sodium hydroxide, potassium hydroxide, or ammonia is used. The addition rate with respect to the formyl group of the polymer is 0.05 to 2.0 equivalents, and further preferably 0.4 to 1.2 equivalents.

The appropriate acid for hydrolysis is not particularly limited as long as the pH during hydrolysis can be kept within the range of 0 to 5. Examples of such an acid may include: an inorganic acid such as a hydrohalic acid, a sulfuric acid, a nitric acid, and a phosphoric acid; and an organic acid such as a monocarboxylic or dicarboxylic acid of 1 to 5 carbon atoms, a sulfonic acid, a benzenesulfonic acid, and a toluenesulfonic acid. Particularly preferably, a hydrohalic acid and a gas of hydrogen halide are used. Most preferably, a hydrohalic acid is used. The addition rate with respect to the formyl group of the polymer is 0.05 to 2.0 equivalents, and further preferably 0.4 to 1.2 equivalents.

The hydrolyzed product is washed with water so that polyvinylamine crosslinked polymer particles can be obtained. When hydrolysis is performed with a base, free type purified polyvinylamine crosslinked polymer particles are obtained. When hydrolysis is performed with an acid, salt type purified polyvinylamine crosslinked polymer particles are obtained.

Next, introduction of a carboxymethyl group will be described. The iminodiacetic acid type chelate resin into which a carboxymethyl group is introduced can be obtained through a reaction of 2 equivalents of a monohaloacetic acid or a salt thereof with amino groups contained in previously prepared polyvinylamine crosslinked polymer particles under an alkaline condition. By this reaction, a sodium salt type carboxymethyl group is introduced into primary amino groups. When a sodium salt type carboxymethyl group is introduced in an amount of 50% by mass or more with respect to the dry mass after the introduction, the effects as a chelate resin are significant. The introduced amount is preferably 60% by mass or more.

The halogen to be used can be any of chlorine, bromine, and iodine. A monochloroacetic acid and sodium monochloroacetate, which are high in both solubility and reactivity and can be easily used, are most suitable.

The alkaline condition is achieved by using a reagent capable of supplying hydroxide ions, carbonic acid ions, and the like. Examples thereof may include sodium hydroxide, potassium hydroxide, sodium carbonate, and sodium hydrogen carbonate. These need to be used in an amount of 2 equivalents or more with respect to the amino groups. The total amount of the reagent may be added at once, or may be added in fractional amounts.

The reaction temperature is within the range of 20 to 90° C. At 20° C., the reaction rate decreases. At 90° C., the decomposition of the monohaloacetic acid compound proceeds. Therefore, 40 to 80° C. is preferable, and 50 to 80° C. is more preferable.

The necessary reaction time is approximately 1 to 24 hours. The most suitable reaction time changes depending on the reaction temperature. When the reaction temperature is 20° C., the reaction time is 24 hours or more. When the reaction temperature is 40° C., the reaction time is 12 hours or more. When the reaction temperature is 50 to 80° C., the reaction time is 3 to 8 hours.

Next, the method for adsorbing and separating metal ions with the chelate resin according to the present invention will be described. The chelate resin according to the present invention is employed as a chelate resin for use in known water treatment. In general, a column is filled with the chelate resin, and drainage water or the like is allowed to run through the column, so that metal ions are adsorbed. Other than this, the chelate resin is added into a target liquid, and thereafter the mixture is mixed under any stirring condition such as a turbulent flow or a laminar flow so that a target substance is allowed to be adsorbed. That is, the chelate resin exhibits a high adsorption ability to metal ions contained in waste water of various industries and processes, and also can be used for the adsorption treatment of an acidic substance, formaldehydes, an organic compound, and the like. Furthermore, the crosslinked polymer particles according to the present invention preferably have a spherical shape. With the spherical shape, the adsorption ability to metal ions tends to be high. When the crosslinked polymer particles are used as an adsorbent in a column, there are advantages such as high filling efficiency, stabilization of a flow channel, high separation efficiency, and improvement of treatment capacity.

Although the chelate resin according to the present invention has a high adsorption ability to metal ions, the chelate resin exhibits a higher adsorption ability to heavy metal ions such as copper ions, iron ions, and zinc ions, among metal ions.

EXAMPLES

Hereinafter, the present invention will be described in further detail by way of examples. However, the present invention is not restricted to the following examples, as long as it does not depart from the gist of the present invention. First, the chelate resin according to the present invention was produced, and the adsorption ability to metal ions was evaluated. A comparative product was a general-purpose product used as an iminodiacetic acid type chelate resin for the purpose of the adsorption of heavy metal ions. As such a product, an iminodiacetic acid type chelate resin Muro-Chelate B-1 (comparative product) manufactured by Muromachi Technos Co., Ltd., which is also described in Japanese Patent Application Laid-Open No. 2008-050198 was used.

Production Example 1 of Polyvinylamine Crosslinked Polymer Particles 100 g of demineralized water, 64.0 g of ammonium sulfate, and 1.00 g of an aqueous solution of polyacryloyloxyethyl trimethylammonium chloride (polymer concentration: 20% by mass, weight average molecular weight: 800,000) were charged into a 500 mL four-necked flask. The mixture was stirred and dissolved to obtain a polymerization bath. 33.4 g of N-vinylformamide, 2.80 g of divinylbenzene, 4.00 g of acrylonitrile, and 0.12 g of an azo-based polymerization initiator, 2,2'-azobis(4-methoxy-2,4-dimethylvaleronitrile) (V-70, manufactured by Wako Pure Chemical Industries, Ltd.) were mixed together to obtain a monomer solution. The monomer solution and the polymerization bath were mixed to each other, and stirred at 180 rpm while the atmosphere in a flask was substituted with nitrogen. After 30 minutes, the temperature was raised. The polymerization was performed at 45° C. for 3 hours, and subsequently at 60° C. for 2 hours. After the polymerization, the resultant product was filtrated, washed with water, and filtrated to obtain 88.9 g of polymer spherical particles in a water-containing state. The solid content ratio was 38.8%. Into a four-necked flask, 51.6 g of the reaction product obtained in this manner was charged, and 46.8 g of a 48% by mass aqueous solution of sodium hydroxide was added thereto. The mixture was hydrolyzed while stirring at 80° C. for 7 hours. The obtained product was washed with water and filtrated to obtain 19.7 g of polyvinylamine spherical particles in a water-containing state. As a result of observation through a microscope, spherical particles of 50 μm to 2 mm were observed. The polymer particles obtained in this manner are referred to as polyvinylamine crosslinked polymer particles 1.

Production Example 2 of Polyvinylamine Crosslinked Polymer Particles 961 g of demineralized water, 640 g of ammonium sulfate, and 4.0 g of an aqueous solution of polyacryloyloxyethyl trimethylammonium chloride (polymer concentration: 20% by mass, weight average molecular weight: 800, 000) were charged into a 3000 mL four-necked flask. The mixture was stirred and dissolved to obtain a polymerization bath. 360 g of N-vinylformamide, 20.0 g of divinylbenzene, 20.0 g of acrylonitrile, and 1.2 g of an azo-based polymerization initiator, 2,2'-azobis(4-methoxy-2,4-dimethylvaleronitrile) (V-70, manufactured by Wako Pure Chemical Industries, Ltd.) were mixed together to obtain a monomer solution. The monomer solution and the polymerization bath were mixed to each other, and stirred at 110 rpm while the atmosphere in a flask was substituted with nitrogen. After 30 minutes, the temperature was raised. The polymerization was performed at 50° C. for 3 hours, and subsequently at 60° C. for 1 hour. After the polymerization, the resultant product was filtrated, washed with water, and filtrated to obtain 1107 g of polymer spherical particles in a water-containing state. The solid content ratio was 31.0%. Into a four-necked flask, 645 g of the reaction product obtained in this manner was charged, and 468 g of a 48% by mass aqueous solution of sodium hydroxide was added thereto. The mixture was hydrolyzed while stirring at 80° C. for 6 hours. The obtained product was washed with water and filtrated to obtain 689 g of polyvinylamine spherical particles in a water-containing state. As a result of observation through a microscope, spherical particles of 50 µm to 2 mm were observed. The polymer particles obtained in this manner are referred to as polyvinylamine crosslinked polymer particles 2.

Production Example 3 of Polyvinylamine Crosslinked Polymer Particles 99.1 g of demineralized water, 64.2 g of ammonium sulfate, and 1.1 g of an aqueous solution of polyacryloyloxyethyl trimethylammonium chloride (polymer concentration: 20% by mass, weight average molecular weight: 800,000) were charged into a 300 mL four-necked flask. The mixture was stirred and dissolved to obtain a polymerization bath. 35.2 g of N-vinylformamide, 2.41 g of divinylbenzene, 2.41 g of acrylonitrile, and 0.12 g of an azo-based polymerization initiator, 2,2'-azobis(4-methoxy-2,4-dimethylvaleronitrile) (V-70, manufactured by Wako Pure Chemical Industries, Ltd.) were mixed together to obtain a monomer solution. The monomer solution and the polymerization bath were mixed to each other, and stirred at 180 rpm while the atmosphere in a flask was substituted with nitrogen. After 30 minutes, the temperature was raised. The polymerization was performed at 45° C. for 3 hours, and subsequently at 60° C. for 2 hours. After the polymerization, the resultant product was filtrated, washed with water, and filtrated to obtain 97.3 g of polymer spherical particles in a water-containing state. The solid content ratio was 35.3%. Into a four-necked flask, 56.7 g of the reaction product obtained in this manner was charged, and 46.8 g of a 48% by mass aqueous solution of sodium hydroxide was added thereto. The mixture was hydrolyzed while stirring at 80° C. for 6 hours. The obtained product was washed with water and filtrated to obtain 55.4 g of polyvinylamine spherical particles in a water-containing state. As a result of observation through a microscope, spherical particles of 50 µm to 2 mm were observed. The polymer particles obtained in this manner are referred to as polyvinylamine crosslinked polymer particles 3.

Production Example 4 of Polyvinylamine Crosslinked Polymer Particles 100 g of demineralized water, 64.0 g of ammonium sulfate, and 1.00 g of an aqueous solution of polyacryloyloxyethyl trimethylammonium chloride (polymer concentration: 20% by mass, weight average molecular weight: 800,000) were charged into a 500 mL four-necked flask. The mixture was stirred and dissolved to obtain a polymerization bath. 33.4 g of N-vinylformamide, 1.00 g of pentaerythritol triallyl ether (NEOALLYL P-30 manufactured by OSAKA SODA CO., LTD.), 1.00 g of acrylonitrile, and 0.12 g of an azo-based polymerization initiator, 2,2'-azobis(4-methoxy-2,4-dimethylvaleronitrile) (V-70, manufactured by Wako Pure Chemical Industries, Ltd.) were mixed together to obtain a monomer solution. The monomer solution and the polymerization bath were mixed to each other, and stirred at 180 rpm while the atmosphere in a flask was substituted with nitrogen. After 30 minutes, the temperature was raised. The polymerization was performed at 40° C. for 3 hours, and subsequently at 70° C. for 2 hours. After the polymerization, the resultant product was filtrated, washed with water, and filtrated to obtain 210 g of polymer spherical particles in a water-containing state. The solid content ratio was 15.7%. Into a four-necked flask, 150 g of the reaction product obtained in this manner was charged, and 14.0 g of a 48% by mass aqueous solution of sodium hydroxide was added thereto. The mixture was hydrolyzed while stirring at 80° C. for 5 hours. The obtained product was washed with water and filtrated to obtain 253 g of polyvinylamine spherical particles in a water-containing state. As a result of observation through a microscope, spherical particles of 50 µm to 2 mm were observed. The polymer particles obtained in this manner are referred to as polyvinylamine crosslinked polymer particles 4.

Production Example 1 of Iminodiacetic Acid Type Chelate Resin 10.1 g (dry mass 2.81 g) of the polyvinylamine crosslinked polymer particles 1, 40.0 g of deionized water, and 17.5 g of sodium monochloroacetate were added into a 200 mL separable flask. The mixture was warmed to 80° C. while stirring. After one hour of the stirring, 25.0 g of a 24% by mass aqueous solution of sodium hydroxide was added. Thereafter, the product was heated and stirred for 3 hours while 80° C. was maintained. The product having been left to cool down was filtrated to obtain 20.3 g (dry mass 8.44 g) of an iminodiacetic acid type chelate resin. With respect to 1 g (dry mass) of the polyvinylamine crosslinked polymer particles, 2.0 g of a sodium type carboxymethyl group had been introduced. That is, a sodium type carboxymethyl group had been introduced in an amount of 67% by mass with respect to the dry mass after the introduction. This chelate resin is referred to as Production Example 1.

Production Example 2 of Iminodiacetic Acid Type Chelate Resin 100.0 g (dry mass 31.2 g) of the polyvinylamine crosslinked polymer particles 1, 100.0 g of deionized water, 131.6 g of sodium monochloroacetate, and 89.3 g of a 48% by mass aqueous solution of sodium hydroxide were added into a 500 mL separable flask. The mixture was stirred at 40° C. for 22 hours. The product having been left to cool down was filtrated to obtain 186.0 g (dry mass 84.1 g) of an iminodiacetic acid type chelate resin. With respect to 1 g (dry mass) of the polyvinylamine crosslinked polymer particles, 1.7 g of a sodium type carboxymethyl group had been introduced. That is, a sodium type carboxymethyl group had been introduced in an amount of 63% by mass with respect to the dry mass after the introduction. This chelate resin is referred to as Production Example 2.

Production Example 3 of Iminodiacetic Acid Type Chelate Resin 52.6 g (dry mass 10.0 g) of the polyvinylamine crosslinked polymer particles 2, 142 g of deionized water, and 79.8 g of sodium monochloroacetate were added into a 500 mL separable flask. The mixture was warmed to 80° C. while stirring. After one hour of the stirring, 89 g of a 24% by mass aqueous solution of sodium hydroxide was added. Thereafter, the product was heated and stirred for 5 hours while 80° C. was maintained. The product having been left to cool down was filtrated to obtain 93.6 g (dry mass 31.7 g) of an iminodiacetic acid type chelate resin. With respect to 1 g (dry mass) of the polyvinylamine crosslinked polymer particles, 2.17 g of a sodium salt type carboxymethyl group had been introduced. That is, a sodium salt type carboxymethyl group had been introduced in an amount of 68.5% by mass with respect to the dry mass after the introduction. This chelate resin is referred to as Production Example 3.

Production Example 4 of Iminodiacetic Acid Type Chelate Resin 10.0 g (dry mass 2.34 g) of the polyvinylamine crosslinked polymer particles 3, 40.1 g of deionized water, and 17.52 g of sodium monochloroacetate were added into a 200 mL separable flask. The mixture was warmed to 80° C. while stirring. After one hour of the stirring, 25 g of a 24% by mass aqueous solution of sodium hydroxide was added. Thereafter, the product was heated and stirred for 5 hours while 80° C. was maintained. The product having been left to cool down was filtrated to obtain 24.5 g (dry mass 8.06 g) of an iminodiacetic acid type chelate resin. With respect to 1 g (dry mass) of the polyvinylamine crosslinked polymer particles, 2.44 g of a sodium salt type carboxymethyl group had been introduced. That is, a sodium salt type carboxymethyl group had been introduced in an amount of 71.0% by mass with respect to the dry mass after the introduction. This chelate resin is referred to as Production Example 4.

Production Example 5 of Iminodiacetic Acid Type Chelate Resin 20.0 g (dry mass 5.86 g) of the polyvinylamine crosslinked polymer particles 4, 100.0 g of deionized water, 60.6 g of sodium monochloroacetate, and 68.9 g of potassium carbonate were added into a 500 mL separable flask. The mixture was stirred at 80° C. for 7 hours. The product having been left to cool down was filtrated to obtain 157.4 g (dry mass 11.5 g) of an iminodiacetic acid type chelate resin. With respect to 1 g (dry mass) of the polyvinylamine crosslinked polymer particles, 1.0 g of a sodium type carboxymethyl group had been introduced. That is, a sodium type carboxymethyl group had been introduced in an amount of 50% by mass with respect to the dry mass after the introduction. This chelate resin is referred to as Production Example 5.

Test Example 1

Adsorption Test of Copper Ions

A copper sulfate pentahydrate was dissolved in ion exchanged water to prepare 500 mL of a 113.6 ppm solution of copper ions. The iminodiacetic acid type chelate resin according to Production Example 1 in a wet state with water was added in an amount of 100 mg to 200 g of the above-described copper ion solution. The mixture was stirred at 40 rpm with a stirrer. After 24 hours of the stirring, a supernatant liquid was sampled, and filtrated through a 0.2 µm filter. The remaining amount of copper ions in the obtained liquid was measured using an atomic absorption spectrophotometer (AA-6800, manufactured by Shimadzu Corporation). From the measured value, the adsorption amount (g) with respect to 1 g of the chelate resin in terms of wet or dry mass was calculated. Also, the iminodiacetic acid type chelate resins according to Production Examples 2, 3, and 4 were subjected to the test similar to that in Test Example 1. The results are shown in Table 1.

Comparative Test Example 1

Adsorption Test of Copper Ions

A copper sulfate pentahydrate was dissolved in ion exchanged water to prepare 500 mL of a 113.6 ppm solution of copper ions. The iminodiacetic acid type chelate resin Muro-Chelate (comparative product) in a wet state with water was added in an amount of 100 mg to 200 g of the above-described copper ion solution. The mixture was stirred at 40 rpm with a stirrer. After 24 hours of the stirring, a supernatant liquid was sampled, and filtrated through a 0.2 µm filter. The remaining amount of copper ions in the obtained liquid was measured using an atomic absorption spectrophotometer (AA-6800, manufactured by Shimadzu Corporation). From the measured value, the adsorption amount (g) with respect to 1 g of the chelate resin in terms of wet or dry mass was calculated. The results are shown in Table 1.

Test Example 2

Adsorption Test of Iron Ions

A 35 mass % solution of iron (III) chloride was dissolved in ion exchanged water to prepare 500 mL of 120.8 ppm solution of iron (III) ions. The iminodiacetic acid type chelate resin according to Production Example 1 in a wet state with water was added in an amount of 100 mg to 200 g of the above-described solution. The mixture was stirred at 40 rpm with a stirrer. After 24 hours of the stirring, a supernatant liquid was sampled, and filtrated through a 0.2 µm filter. The remaining amount of iron ions in the obtained liquid was measured using an atomic absorption spectrophotometer (AA-6800, manufactured by Shimadzu Corporation). From the measured value, the adsorption amount (g) with respect to 1 g of the chelate resin in terms of wet or dry mass was calculated. The results are shown in Table 1.

Comparative Test Example 2

Adsorption Test of Iron Ions

A 35 mass % solution of iron (III) chloride was dissolved in ion exchanged water to prepare 500 mL of 120.8 ppm solution of iron (III) ions. The iminodiacetic acid type chelate resin Muro-Chelate (comparative product) in a wet state with water was added in an amount of 100 mg to 200 g of the above-described solution. The mixture was stirred at 40 rpm with a stirrer. After 24 hours of the stirring, a supernatant liquid was sampled, and filtrated through a 0.2 µm filter. The remaining amount of iron ions in the obtained liquid was measured using an atomic absorption spectrophotometer (AA-6800, manufactured by Shimadzu Corporation). From the measured value, the adsorption amount (g) with respect to 1 g of the chelate resin in terms of wet or dry mass was calculated. The results are shown in Table 1.

Test Example 3

Adsorption Test of Zinc Ions

Zinc chloride was dissolved in ion exchanged water to prepare 500 mL of a 105.1 ppm solution of zinc ions. The iminodiacetic acid type chelate resin according to Production Example 1 in a wet state with water was added in an amount of 100 mg to 200 g of the above-described zinc ion solution. The mixture was stirred at 40 rpm with a stirrer. After 24 hours of the stirring, a supernatant liquid was sampled, and filtrated through a 0.2 μm filter. The remaining amount of zinc ions in the obtained liquid was measured using an atomic absorption spectrophotometer (AA-6800, manufactured by Shimadzu Corporation). From the measured value, the adsorption amount (g) with respect to 1 g of the chelate resin in terms of wet or dry mass was calculated. The results are shown in Table 1.

Comparative Test Example 3

Adsorption Test of Zinc Ions

Zinc chloride was dissolved in ion exchanged water to prepare 500 mL of a 105.1 ppm solution of zinc ions. The iminodiacetic acid type chelate resin Muro-Chelate (comparative product) in a wet state with water was added in an amount of 100 mg to 200 g of the above-described zinc ion solution. The mixture was stirred at 40 rpm with a stirrer. After 24 hours of the stirring, a supernatant liquid was sampled, and filtrated through a 0.2 μm filter. The remaining amount of zinc ions in the obtained liquid was measured using an atomic absorption spectrophotometer (AA-6800, manufactured by Shimadzu Corporation). From the measured value, the adsorption amount (g) with respect to 1 g of the chelate resin in terms of wet or dry mass was calculated. The results are shown in Table 1.

TABLE 1

| Test Example | Metal Ion | Iminodiacetic acid type chelate resin | Metal Adsorption Amount in wet state (g) | Metal Adsorption Amount in dry state (g) |
|---|---|---|---|---|
| Test Example 1 | Cu | Production Example 1 | 0.134 | 0.322 |
| | | Production Example 2 | 0.106 | 0.234 |
| | | Production Example 3 | 0.089 | 0.263 |
| | | Production Example 4 | 0.076 | 0.231 |
| Comparative Test Example 1 | | Comparative Product | 0.061 | 0.144 |
| Test Example 2 | Fe (III) | Production Example 1 | 0.042 | 0.101 |
| Comparative Test Example 2 | | Comparative Product | 0.009 | 0.021 |
| Test Example 3 | Zn | Production Example 1 | 0.095 | 0.228 |
| Comparative Test Example 3 | | Comparative Product | 0.059 | 0.139 |

Metal Adsorption Amount (g): metal adsorption amount (g) with respect to 1 g of chelate resin in terms of wet or dry mass It could be confirmed that in a case where the iminodiacetic acid type chelate resin according to the present invention is added, the adsorption amounts of copper ions, iron (III) ions, and zinc ions are higher than the comparative product.

The invention claimed is:

1. Iminodiacetic acid type chelate resin wherein:
   a sodium salt type carboxymethyl group is introduced into primary amino groups of polyvinylamine crosslinked polymer particles in an amount of 50% by mass or more with respect to a dry mass after the introduction.

2. A method for producing the iminodiacectic acid type chelate resin according to claim 1 the method comprising:
   performing suspension polymerization in salt water containing an N-vinyl carboxylic acid amide and a crosslinkable monomer in a presence of a dispersant to obtain crosslinked polymer particles;
   hydrolyzing the obtained crosslinked polymer particles to obtain the polyvinylamine crosslinked polymer particles; and
   introducing the sodium salt type carboxymethyl group into primary amino groups of the polyvinylamine crosslinked polymer particles in an amount of 50% by mass or more with respect to a dry mass after the introduction.

* * * * *